United States Patent
Parker et al.

(10) Patent No.: US 6,288,517 B1
(45) Date of Patent: Sep. 11, 2001

(54) HARDWARE MULTIPHASE SINEWAVE GENERATOR

(75) Inventors: David C. Parker, Midland; Joerg Hollmann, Nolalu, both of (CA)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/163,938

(22) Filed: Sep. 29, 1998

(51) Int. Cl.[7] .................................................. H02P 5/28
(52) U.S. Cl. ............................ 318/811; 318/289; 318/280
(58) Field of Search ................................... 318/280, 289, 318/685, 696, 439, 495, 503, 807, 809, 811; 327/113, 129, 257, 259; 324/83 D; 340/347 DA

(56) References Cited

U.S. PATENT DOCUMENTS

| | | | |
|---|---|---|---|
| 3,641,566 | * 2/1972 | Konrad et al. | 340/347 |
| 4,059,789 | * 11/1977 | Cocksedge | 318/608 |
| 4,377,779 | * 3/1983 | Plunkett | 318/811 |
| 4,405,895 | * 9/1983 | Gerst et al. | 324/83 D |
| 4,459,580 | * 7/1984 | Furukawa | 340/347 DA |
| 4,862,343 | * 8/1989 | Nomura et al. | 363/41 |
| 5,283,726 | * 2/1994 | Wilkerson | 363/41 |

* cited by examiner

Primary Examiner—Robert E. Nappi
Assistant Examiner—Rita Leykin
(74) Attorney, Agent, or Firm—William C. Schubert; Glenn H. Lenzen, Jr.

(57) ABSTRACT

A method and circuit for controlling motors utilizing a multiple-phase sinusoidal signal generator (80) with control inputs (71,72,76) for determining motor (84) speed and direction. The multiphase sinewave generator has a synchronous-digital state machine (70) that provides a plurality of analog signals (1A–12A) having phase-shifted waveforms. A resistive-ring network (30) and instrumentation amplifiers (31) shapes the plurality of analog signals to provide a multiphase set of sinusoidal signals (77). Automatic-motor-control systems modify control-inputs (71,72,76) into the multiphase generator (80) based on feedback (105,86) to control motor (84) speed and direction.

12 Claims, 7 Drawing Sheets

HARDWARE MULTIPHASE SINEWAVE GENERATOR

TECHNICAL FIELD

The present invention relates to motor control systems having multiphase sinusoidal AC signals. Motor control is provided for stepper motors, brushless DC-motors or three-phase induction motors such as those used in electrical vehicles. Other applications for the present invention include DC to AC power converters.

BACKGROUND OF THE INVENTION

Multiphase sinewave generators constructed using methods of prior art which require computer software and look-up tables to generate the required signals to drive multiphase systems are prone to system malfunctions. Software-based systems require a microprocessor, memory and interface logic, and have a start-up delay. Current technology limits current software-based systems to about 30 khz.

Multiphase sinewave generators constructed using methods of prior art which require capacitors and inductors cannot be fully integrated within a single LSI chip which unnecessarily limits reduction of the physical size of the required circuit. Capacitors and inductors limit the attainable circuit speed and at speeds approaching zero are unable to maintain the correct phase relationships.

Multiphase generators that produce triangular-shaped waveforms are easier to produce in hardware but have undesired harmonics.

SUMMARY OF THE INVENTION

Circuits constructed using methods of the present invention provide multiple-phase sinusoidal output signals which can be used to drive either two, three or five-phase stepper motors, brushless DC motors or three-phase induction motors such as those used in electrical vehicles. Other applications for the present invention include DC to AC power converters. Methods and apparatus described herein include a flexible basic design and variations. One embodiment provides for motor speed stabilization through precise motor speed control utilizing feedback. Another embodiment provides for manual control of motor speed and rotation direction. Methods taught herein provide for systems that control, to a high degree of precision, the degrees of a turn of a motor and provide for low harmonic distortion which prevents noise and oscillation in motors and power transformers. Methods are described for changing the circuit parameters to adjust the level and frequency of harmonic distortion of the sinusoidal output signals to meet the requirements of a range of applications.

The preferred embodiment of the present invention utilizes a synchronous-digital state machine to generate a plurality of analog signals having phase-shifted waveforms. A resistive-ring network shapes the waveforms to generate a plurality of phase-shifted differential signals, each having a waveform that approximates the shape of a sinusoid waveform. Instrumentation amplifiers amplify selected differential signals to provide a multiphase set of sinusoidal signals.

The teachings of the present invention provide for different specific embodiments which provide advantages not found in prior art such as: (1) enabling increased integration resulting in substantial reduction in physical circuit size greatly facilitating new applications such as applications involving nano-motors or micro-miniature motors, (2) elimination of capacitors and inductors to allow the circuit to be fully integrated within a LSI chip and to allow for higher output frequencies, (3) elimination of a computer memory and software resulting in substantial increase in the life of the circuit, increases the reliability of operation, lowers system cost, and allows reduction in the physical size of the generator.

TABLE 1 lists exemplary values of CDAC circuit constant inputs for 12-input systems having 48 steps and 240 steps.

DETAILED DESCRIPTION OF PREFERRED EMBODIMENTS

Figure 1:
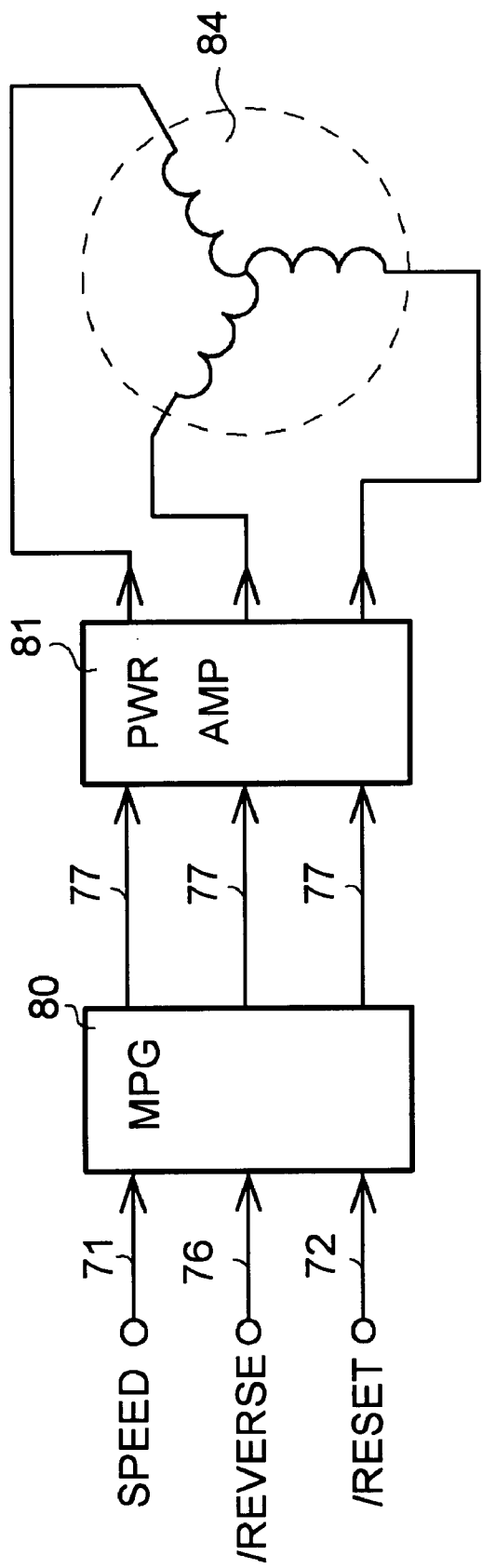
FIG. 1 shows an example of motor control systems in accordance with the present invention.

FIG. 1. shows an example of a motor control system of the present invention. Multiphase generator (MPG) (80) provides a set of multiphase (84). Motor (84) can be a two, three or five-phase stopper motor, three-phase induction motor, brushless DC motor, or DC to AC power converter, and others types. Motor control is provided by digital input signal SPEED (71), /RESET (72) and /REVERSE (76). SPEED (71) determines the SPEED of motor (84). The /RESET input is used to put MPG (80) into an initial state, and the /REVERSE input is used to reverse the direction of the motor (101).

Figure 2:
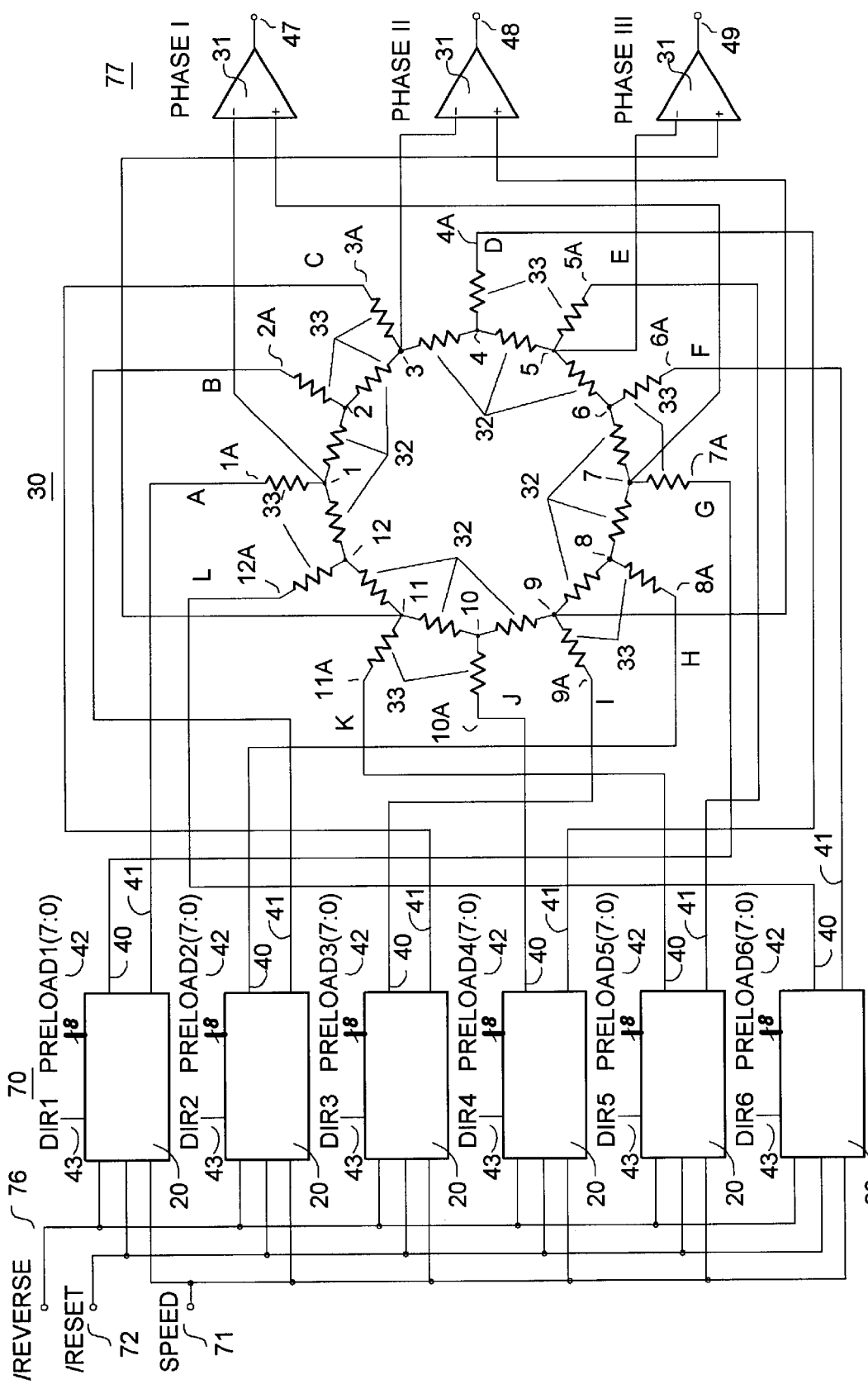
FIG. 2 schematically illustrates an embodiment of a 12-input sinewave generator in accordance with the present invention.

FIG. 2 illustrates an example of the three-phase waveform generator (80) of FIG. 1. External-digital-inputs SPEED (71), /RESET (72) and /REVERSE (76) are inputs to synchronous state machine (70) comprised of six identical Counter-Digital-to-Analog-Converter (CDAC) logic blocks (20). Each of the CDAC circuits (20) has unique constant inputs PRELOAD(7:0) (42) and DIR (43), and generates two outputs that drive the 12-input ring-resistor network

(30) that is comprised of 12 ring resistors (32) and 12 input resistors (33). Three instrumentation amplifiers (31) amplify selected differential signals to provide a multiphase set (77) of sinusoidal output signals. The periodic waveforms (showing voltage variance with time) of the multiphase set (77) of signals have a sinusoidal shape and are phase-shifted in relationship to each other. Control input SPEED (71) provides a digital clock that drives state machine (70). /RESET (72) and /REVERSE (76) are control inputs which change synchronous to input clock SPEED (71). A low on /RESET (72) puts the state machine (70) into an initial state. The frequency of the input SPEED (71) determines the frequency of the multiphase set (77) of sinusoidal signals. /REVERSE control input (76) determines order of the phase-shift relationship of the multiphase set (77) of signals which determines the rotational direction of the motor (84).

Figure 3:
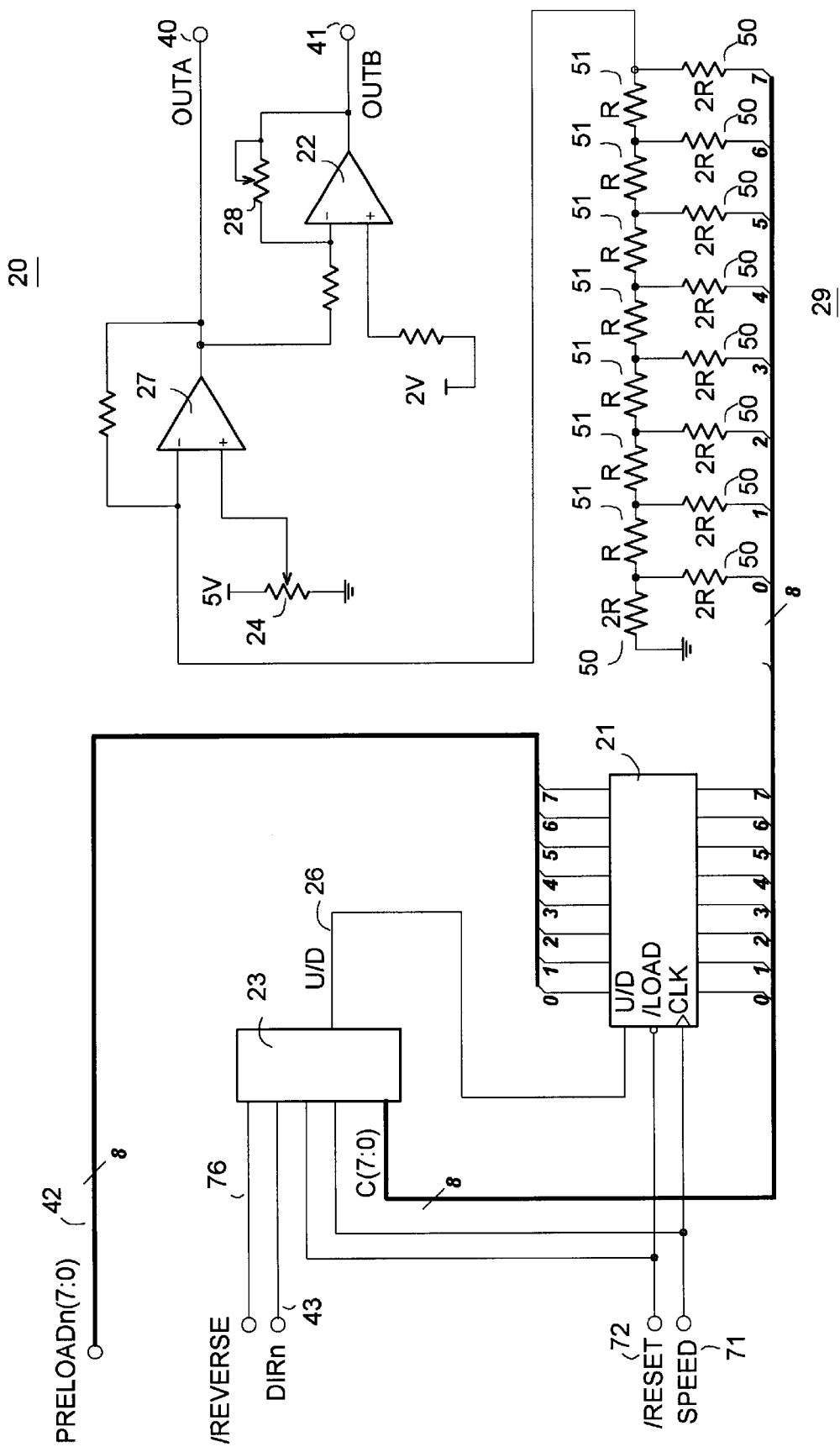
FIG. 3 schematically illustrates an embodiment of the CDAC circuit portion of the sinewave generator in accordance with the present invention.
Figure 6:
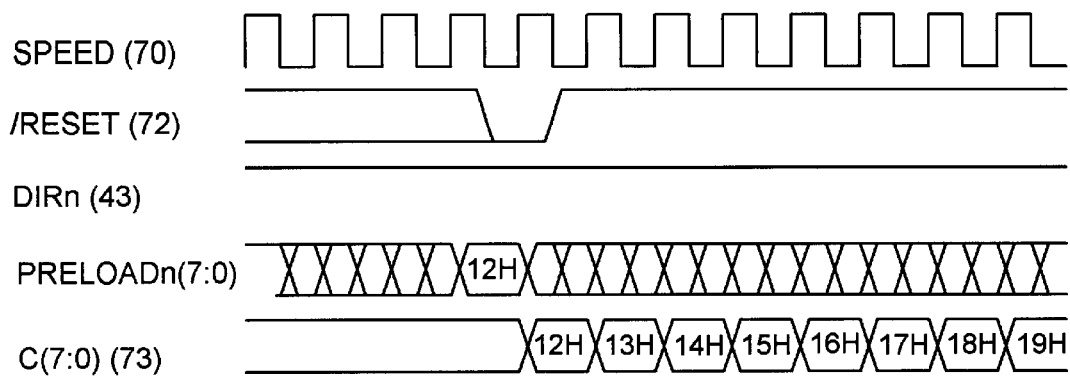
FIG. 6 shows an example of signal waveforms of a CDAC circuit in accordance with the present invention.
Figure 7:
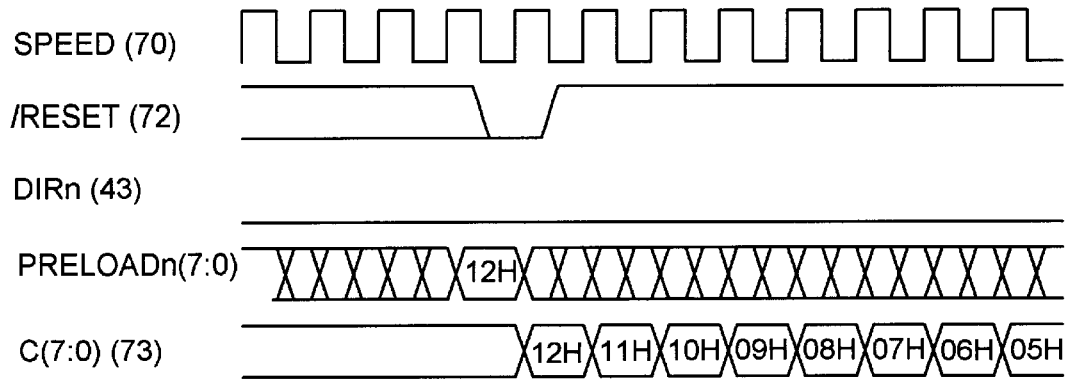
FIG. 7 shows an example of signal waveforms of a CDAC circuit in accordance with the present invention.

FIG. 3 illustrates an exemplary CDAC circuit (20) of FIG. 2. This embodiment is comprised of a control logic block (23), up-down-synchronous-binary counter (21) and a digital-to-analog converter (24). When /RESET (45) is in an active state, the state machine enters to an initial state. In this state, the counter outputs C(7:0) (73) are loaded with the preset values PRELOAD(7:0) (42), and the signal U/D (26) is set to reflect the state of the initial direction input DIR (43). When /RESET (72) is in an inactive state the counters (21) count synchronously with clock SPEED (71) either up or down as determined by the state of signal U/D (26) and /REVERSE. FIG. 6 and FIG. 7 depict the response of counters (21) for a CDAC circuit (20) having PRELOAD (7:0) (42) values of 12H and /REVERSE set to an inactive state. FIG. 6 and 7 show the response of counters (21) and when /RESET (45) is unasserted for the case where DIR (43) is set to HIGH and when DIR (43) is set to LOW.

Figure 8:
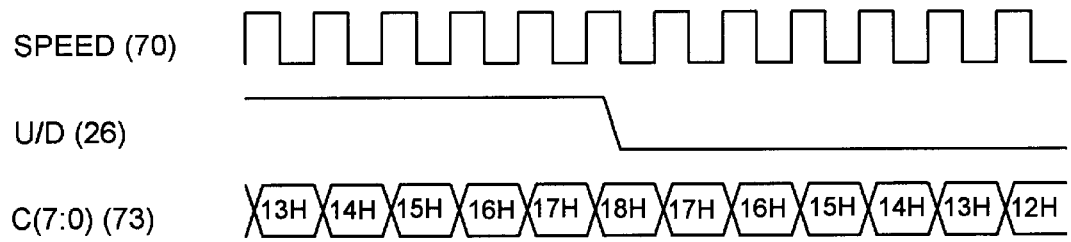
FIG. 8 shows an example of signal waveforms of a CDAC circuit in accordance with the present invention.
Figure 9:
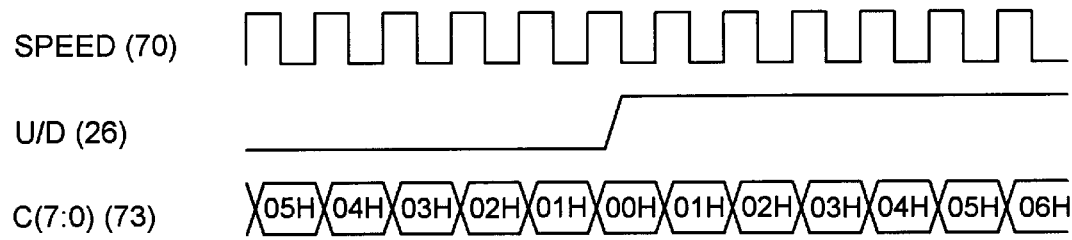
FIG. 9 shows an example of signal waveforms of a CDAC circuit in accordance with the present invention.

When logic block CTL (23) detects C(7:0) (73) has reached either a predefined maximum or minimum value, then U/D (26) changes state causing the counter (21) to reverse direction. FIG. 8 and FIG. 9 show the response of U/D (26) and the counters when the maximum value is 18H and the minimum value is 00h. The number steps of MPG circuit (80) is defined to be twice the number of SPEED (71) clock cycles required for the counters (21) to reach a state where C(7:0) (73) equals the maximum value from the state where C(7:0) (73) equals the minimum value. The number of steps must be a multiple of the number of inputs (1A–12A) in resistor-ring (30) in order for the multiphase set (77) of output signals to have symmetrical phase-shift relationship. The number of steps determines the number of counter register output signals C(7:0) and the time to execute the number of steps is one period of OUTA(40), OUTB(41) and the multiphase set (77) of output signal waveforms. PRELOAD(7:0) (42) and DIR (43) are selected so that signals OUTA (40) and OUT B (41) from each CDAC circuit (20) are delayed a constant amount of time in relation to the OUTA (40) and OUT B (41) signals generated by the other CDAC circuits (20) with the result that the periodic waveforms of OUTA (40) and OUTB (41) are phase-shifted in relationship to OUTA (40) and OUTB (41) signals from the other CDAC circuits (20). Table 1 shows the initial values for PRELOAD(7:0) (42) and DIR (43) suitable for the circuits of FIG. 2 and FIG. 3 when the number of steps is 48 and when the number of steps is 240.

Figure 4:
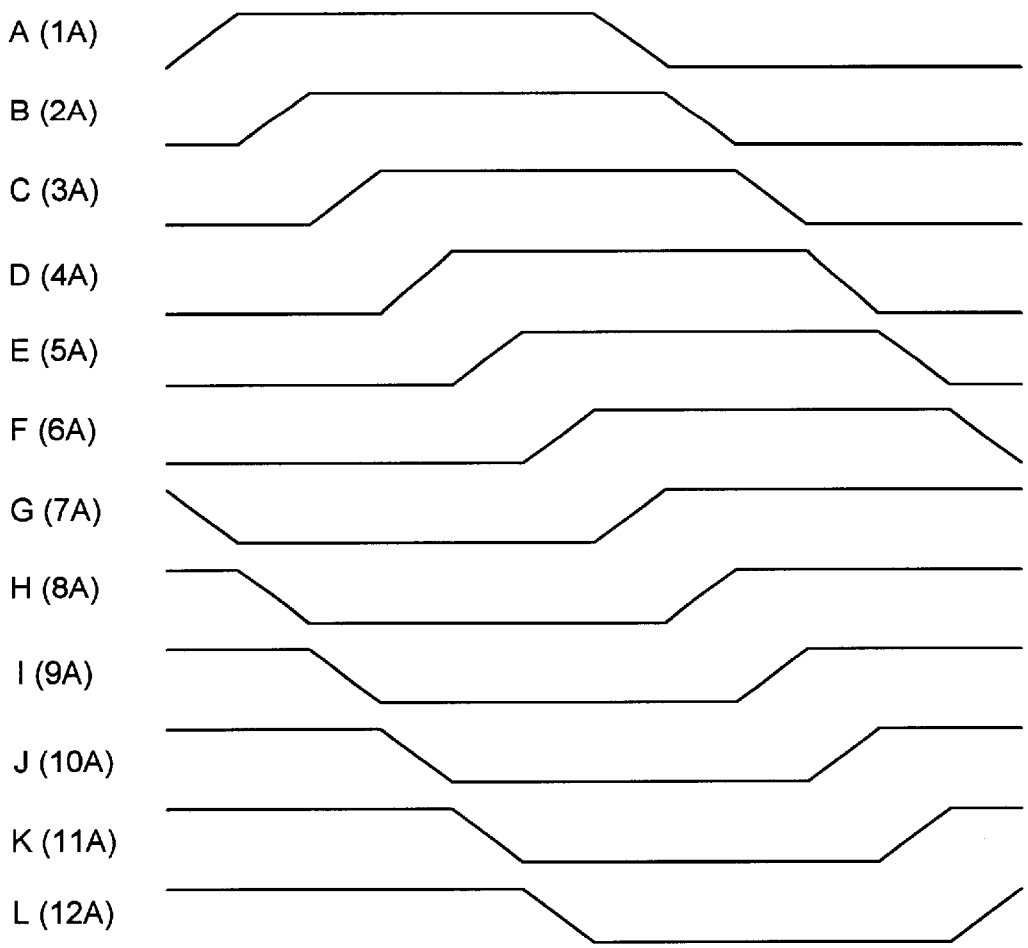
FIG. 4 shows an example of the input waveforms into the 12-input resistor ring shown in FIG. 2 in accordance with the present invention.

When Input /REVERSE (76) is active, then all counters (21) of all CDAC circuits (20) reverse the normal count sequence with the result that the order of the phase-shift relationship of OUTA (40) and OUTB (41) of the CDAC circuits (20) is reversed in time. For example, FIG. 4 shows the waveform when /REVERSE is inactive of OUTA(40) that is connected to node A (1A) as preceding the waveform of OUTA(40) that is connected to node B (2A). When /REVERSE is active the waveform of node A (1A) follows the waveform of B (2A). The reversal of phase-shift relationship of OUTA (40) and OUTB (41) from the CDAC circuits (20) results in the reversal of the phase-shift relationship of the multiphase set (77) of output signals.

TABLE 1

|  | 48 Steps | 240 Steps |
| --- | --- | --- |
| PRELOAD1(7:0) | 10 | 50 |
| DIR 1 | UP | UP |
| PRELOAD2(7:0) | 14 | 70 |
| DIR 2 | UP | UP |
| PRELOAD3(7:0) | 18 | 90 |
| DIR 3 | UP | UP |
| PRELOAD4(7:0) | 22 | 110 |
| DIR 4 | UP | UP |
| PRELOAD5(7:0) | 18 | 90 |
| DIR 5 | DOWN | DOWN |
| PRELOAD6(7:) | 14 | 70 |
| DIR 6 | DOWN | DOWN |

Figure 5:
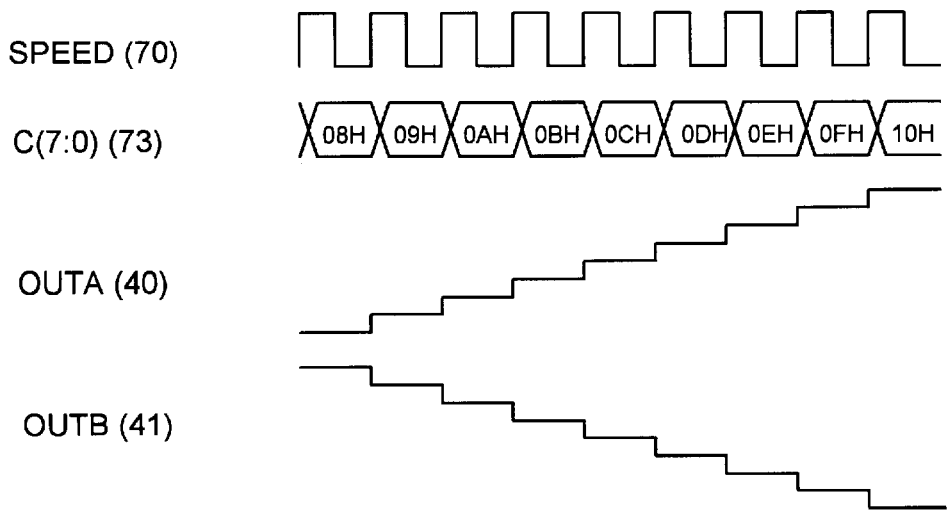
FIG. 5 shows an example of signal waveforms of a CDAC circuit in accordance with the present invention.

Digital-to-analog conversion circuit (DAC) (24) converts the binary value of the counter register outputs C(7:0) (73) into two complementary analog signals OUTA (40) and OUTB (41), each having a periodic waveform which varies between 0V and 4V. The exemplary embodiment of FIG. 3 shows a DAC circuit (24) that is comprised of R-2R ladder resistor network (29), summing amplifier (27), and inverting amplifier (22). R-2R resistor ladder network (29) is comprised of resistors (50) and (51). Resistors (50) have twice the resistive value of resistors (51). The GAIN of summing amplifier (27) is selected to bring amplifier (27) into saturation at 4V and 0V when the binary value of C(7:0) (73) is lower or higher than a selected range of values resulting in a capped-triangular-shaped periodic waveform as illustrated in FIG. 4. The potentiometer (29) enables the symmetry of the OUTA (40) waveform to be precisely adjusted about the 2V level. The offset of inverting amplifier (22) is offset at one-half the value of the maximum output from summing amplifier (27) resulting in a waveform of OUTB (41) that ranges from 0 V to 4V that is the inversion of signal OUTA (40). FIG. 5 depicts the relationship of complementary signals OUTA (40) and OUTB (41) in relationship to C(7:0) when amplifier (27) is not in saturation.

The two complementary signals OUTA (40) and OUTB (41) from the six CDAC circuits (20) connect to the nodes (A–L) (1A–12), as shown in FIG. 2, to drive the resistive-ring network (30). FIG. 4 depicts one period of exemplary waveform of nodes A through L (1A–12A) for the circuit of FIG. 2. The ramp up and down portion of the waveform (where the amplifier is not in saturation) is shown as a line for simplicity. However, this portion has the staircase shape shown in FIG. 5 where the number of steps will vary with selected MPG circuit (80) parameters. In this embodiment the ratio of the time the amplifiers are in saturation as compared to the time they are not in saturation is 5 to 1.

FIG. 2 illustrates an embodiment of a resistor-ring network (30) comprised of 12 loop resistors (32) that are connected in series and 12 input resistors (33). Each node (1–12) connecting two loop resistors (32) is 30 degrees out of phase from adjacent nodes (1–12). Complementary output nodes (1–12) are 180 degrees out of phase with each other. Each pair of complementary output nodes (1/7, 2/8, 3/9, 4/10, 5/11, 6/12) provide a differential signal pair having a sinusoidal shaped waveform. The resistance of each loop resistor (32) in this exemplary embodiment is about 1/12 the value of each input resistor (33). The shape of the curve of the sinusoidal waveform on output (77) is determined by the selection of the value of input resistors (33) and loop resistors (32). The three pair of the complementary nodes (1/7, 3/9, 5/11) each drive a high-impedance-instrumentation amplifier (31) that amplifies the signals to provide a multiphase set (77) of three sinusoidal signals (47, 48, 49). The waveform of each multiphase signal (47, 48, 49) is 120 degrees out of phase from the other signals (47, 48, 49).

In accordance with the methods of the present invention, the number of phases of output (77) is determined by the number of nodes selected for resistor-ring network (30), and the number of instrumentation amplifiers (31) is determined by the number of multiphase output signals (47, 48, 49). A multiphase waveform generator (80) for a five-phase-stepper motor (87) can have a 10 or 20-node resistor network and will have five instrumentation amplifiers. The number of nodes determines the number of CDAC (20) circuits. A 10-input resistive-ring network (30) requires five CDAC circuits (20), and a 20-input resistive-ring network (30) requires 10 CDAC circuits (20). The number of inputs (1A–12A) in the resistor-ring network (30) determines the course or fine approximation of a sinusoidal waveform of multiphase output signal (77). An 120-input MPG system (80) provides outputs having waveforms with low curve gradients that have a shape that closely approximates a sinewave and have low harmonic distortion whereas a 12-input MPG system (80) produces increased harmonic distortion. Increasing the number of steps reduces the harmonic distortion of output signals (77) and has the effect of moving much of the harmonic distortion towards the higher frequencies.

Figure 10:
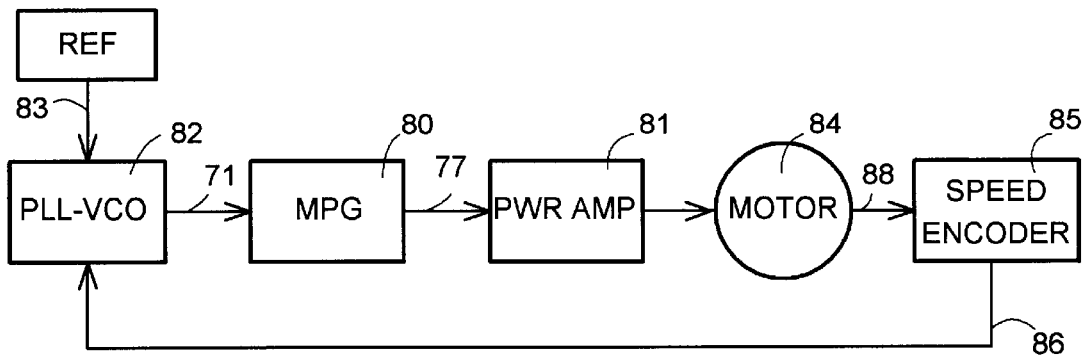
FIG. 10 shows an example of a motor control systems in accordance with the present invention that uses feedback to control motor speed.

An exemplary embodiment of an automatic-motor-control system in accordance with the invention is depicted in FIG. 10. A phase-lock-loop/voltage-controlled oscillator (PLL-VCO) (82) circuit provides the SPEED (71) input to the multiphase generator (80) based on an initial reference input (83). The speed of motor (84) is determined by the frequency of the multiphase set of outputs (77) from multiphase generator (80) that is maintained proportional to the frequency of the SPEED (71) input. Multiphase outputs (77) are amplified by power amplifier (81) to directly drive motor (84). A speed encoder (85) provides a feedback signal (86) indicating actual motor speed to the PLL-VCO (82) circuit which modifies the frequency of SPEED (71) to adjust the actual motor (84) speed closer to the goal specified by the initial reference input (83).

Figure 11:
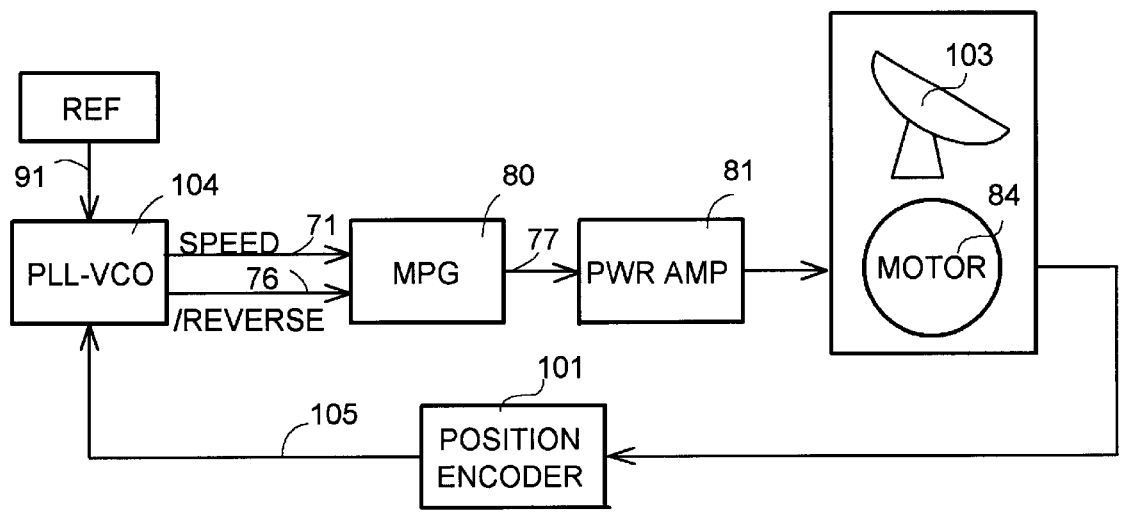
FIG. 11 shows an example of motor control systems in accordance with the present invention that uses feedback to control either motor or device position.

Another embodiment of the invention illustrated by FIG. 11 uses an automatic control system to precisely position a motor driven device (103), such as a solar-powered antenna. In this system, the actual position of either the motor (84) or device (103) is encoded by a position encoder circuit (101) and provided in a feedback signal (105) into the compare/voltage-controlled oscillator (COMP-VCO) (104) circuit which adjusts the SPEED (71) and /REVERSE (76) inputs to multiphase generator (80) based on the initial reference input (91) and feedback position information (105).

Figure 12:
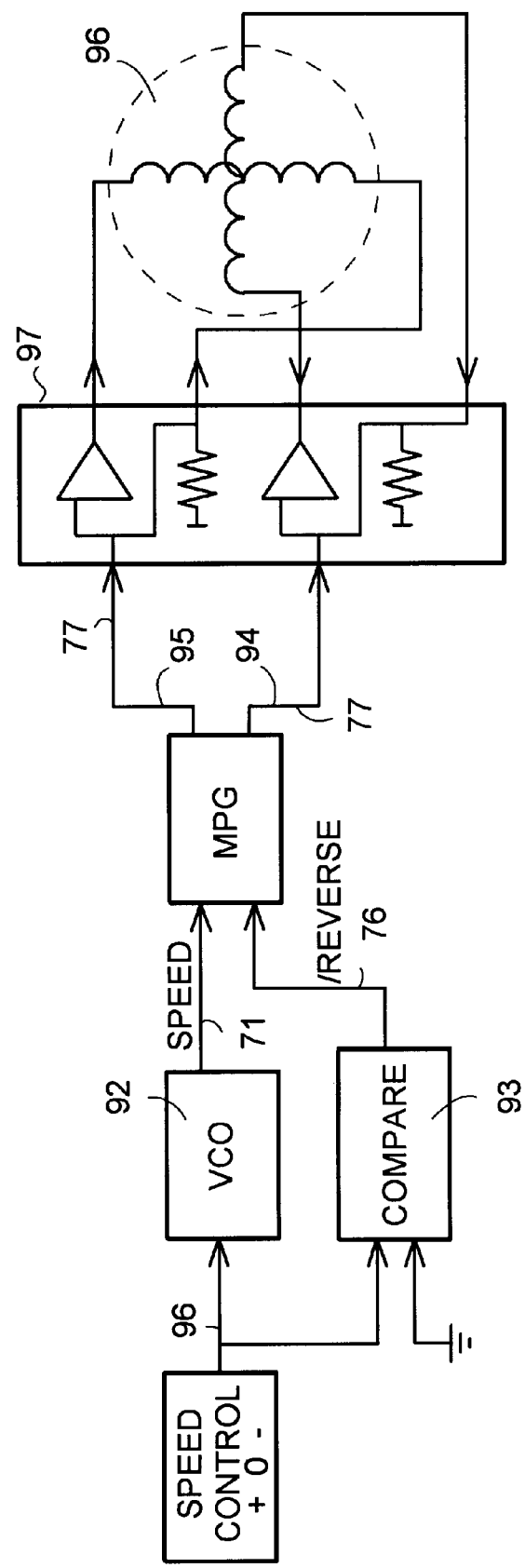
FIG. 12 shows an examples of motor control systems in accordance with the present invention that controls motor speed and direction in response to a input signal.

An embodiment of the invention providing low-noise and high-precision control motor (84) is shown in FIG. 12. The motor, in this example, is a two-phase stepper motor. This system uses input (96) from an external source in the form of a voltage level that indicates the desired speed and direction of motor (84). A voltage controlled oscillator (VCO) (92) generates SPEED (71) with a frequency proportional to the absolute magnitude of the input signal's (91) voltage level. When the voltage level of input signal (96) is negative, the compare circuit (93) activates /REVERSE input (76) to the multiphase generator (80) to cause the motor direction to reverse. The two-phase stepper motor (98) of the embodiment shown in FIG. 12 is driven by a dual-power amplifier (97) with current output which may provide DC Power or Pulse width modulation for energy savings. In this embodiment, multiphase outputs (77) consist of a signal (95) having a sine phase and a signal (94) having a cosine phase.

The present invention, therefore, is well adapted to carry out and attain the advantages mentioned herein as well as other ends and advantages made apparent from the disclosure. While preferred embodiments of the invention have been described for purposes of disclosure, numerous changes and modifications to those embodiments described herein will be readily apparent to those skilled in the art, and are encompassed within the spirit of the invention and the scope of the following claims.

We claim:

1. A circuit for providing multiphase sinewave signals comprising:

a state machine for generating a first plurality of analog signals, each having a periodic waveform corresponding to a desired frequency, wherein said periodic waveforms of said analog signals are phase-shifted in relationship to each other; and a circuit for shaping said analog signals to generate a second plurality of output-sinusoidal signals, each having substantially a sinusoidal waveform of said desired frequency, wherein said sinusoidal waveforms are phase-shifted in relationship to each other and wherein the number of said first plurality is at least twice the number of said second plurality.

2. The circuit of claim 1:

wherein the desired frequency is determined by a speed-input-control signal.

3. A circuit of claim 1 for providing multiphase sinewave signals comprising:

a state machine for generating a first plurality of analog signals, each having a periodic waveform corresponding to a desired frequency, wherein said periodic waveforms of said analog signals are phase-shifted in relationship to each other; and a circuit for shaping said analog signals to generate a second plurality of output-sinusoidal signals, each having substantially a sinusoidal waveform of said desired frequency, wherein said sinusoidal waveforms are phase-shifted in relationship to each other, and wherein said state machine enters an initial state responsive to a reset-control-input signal in a first state.

4. The circuit of claim 1 wherein said circuit for shaping said analog signals further comprises:

a plurality of amplifier circuits, wherein each said output-sinusoidal signal is generated by one of said amplifier circuit.

5. A circuit for providing multiphase sinewave signals comprising:

a state machine for generating a first plurality of analog signals, each having a periodic waveform corresponding to a desired frequency, wherein said periodic waveforms of said analog signals are phase-shifted in relationship to each other; and a circuit for shaping said analog signals to generate a second plurality of output-sinusoidal signals, each having substantially a sinusoidal waveform of said desired frequency, wherein said sinusoidal waveforms are phase-shifted in relationship to each other, and wherein said phase-shift relationship of said plurality of out-put-sinusoidal signals has
a first order responsive to a reverse-control-input signal in a first state; and
a second order responsive to said reverse-control-input signal in a second state wherein said first order is reversed in time of said second order.

6. A circuit for providing multiphase sinewave signals comprising:
a state machine for generating a first plurality of analog signals, each having a periodic waveform corresponding to a desired frequency, wherein said periodic waveforms of said analog signals are phase-shifted in relationship to each other;
a circuit for shaping said analog signals to generate a second plurality of output-sinusoidal signals, each having substantially a sinusoidal waveform of said desired frequency, wherein said sinusoidal waveforms are phase-shifted in relationship to each other;
wherein said circuit for shaping said analog signals further comprises
a plurality of loop resistors connected together in series to form a ring of resistors having a plurality of interconnect nodes; and
a plurality of input resistors wherein each said input-resistor has first node connected to one of said interconnect nodes and a second node connected to one of said analog signals.

7. A circuit for providing multiphase sinewave signals comprising:
a state machine for generating a first plurality of analog signals, each having a periodic waveform corresponding to a desired frequency, wherein said periodic waveforms of said analog signals are phase-shifted in relationship to each other;
a circuit for shaping said analog signals to generate a second plurality of output-sinusoidal signals, each having substantially a sinusoidal waveform of said desired frequency, wherein said sinusoidal waveforms are phase-shifted in relationship to each other;
wherein said state machine further comprises
a plurality of up-down counters wherein each said up-down counter has a plurality of register-output signals;
a plurality of digital-to-analog converters, wherein each said digital-to-analog converter has a plurality of input-signals;
wherein each said input-signal is connected to one of said register-output signals; and
wherein each said digital-to-analog converter generates one of said analog signals.

8. A method of controlling a motor comprising the steps of:
generating a first plurality of analog signals having a periodic waveform corresponding to a desired frequency wherein said periodic waveforms of said analog signals are phase-shifted in relationship to each other;
shaping said analog signals to generate a second plurality of said output-sinusoidal signals having a sinusoidal shaped waveform of said desired frequency wherein said sinusoidal waveforms are phase-shifted in relationship to each other;
providing a motor-speed-control signal for selecting said desired frequency to control the speed of the motor; and providing a motor-reverse-control signal, wherein when said reverse-control-input signal applied to the state machine is in a first state, said phase-shift relationship of said plurality of analog signals has a first order, wherein when said reverse-control-input signal applied to the state machine is in a second state, said phase-shift relationship of said analog signals has a second order, and wherein said first order is reversed in time of said second order.

9. The method for controlling a motor of claim 8, further comprising the step of:
providing a motor-speed-control signal for selecting frequency of said plurality of said output-sinusoidal signals.

10. A method of controlling a motor comprising the steps of:
generating a first plurality of analog signals having a periodic waveform corresponding to a desired frequency, wherein said periodic waveforms of said analog signals are phase-shifted in relationship to each other;
shaping said analog signals to generate a second plurality of said output-sinusoidal signals having a sinusoidal shaped waveform of said desired frequency, wherein said sinusoidal waveforms are phase-shifted in relationship to each other;
providing a motor-speed-control signal for selecting said desired frequency to control the speed of the motor;
providing a motor-reverse-control signal, wherein when said reverse-control-input signal is in a first state, said phase-shift relationship of said plurality of analog signals has a first order, wherein when said reverse-control-input signal is in a second state, said phase-shift relationship of said analog signals has a second order and wherein said first order is the time-inversion of said second order;
providing a speed-control circuit for generating said motor-speed-control signal; and
providing a speed-feedback signal that corresponds to the actual speed of said motor, wherein said speed-feedback signal is an input to said speed-control circuit.

11. A method of controlling a motor comprising the steps of:
generating a first plurality of analog signals having a periodic waveform corresponding to a desired frequency, wherein said periodic waveforms of said analog signals are phase-shifted in relationship to each other;
shaping said analog signals to generate a second plurality of said output-sinusoidal signals having a sinusoidal shaped waveform of said desired frequency, wherein said sinusoidal waveforms are phase-shifted in relationship to each other;
providing a motor-speed-control signal for selecting said desired frequency to control the speed of the motor;
providing a motor-reverse-control signal, wherein when said reverse-control-input signal is in a first state, said phase-shift relationship of said plurality of analog signals has a first order, wherein when said reverse-control-input signal is in a second state, said phase-shift relationship of said analog signals has a second order, and wherein said first order is the time-inversion of said second order;
providing a motor-reverse-control signal, wherein when said reverse-control-input signal is in a first state, said phase-shift relationship of said plurality of analog signals has a first order:

wherein when said reverse-control-input signal is in a second state, said phase-shift relationship of said analog signals has a second order, and wherein said first order is the time-inversion of said second order; and wherein the rotational direction of said motor is determined by said order of said phase relationship of said output-sinusoidal signals.

12. A method of controlling a motor comprising the steps of:

generating a first plurality of analog signals having a periodic waveform corresponding to a desired frequency, wherein said periodic waveforms of said analog signals are phase-shifted in relationship to each other;

shaping said analog signals to generate a second plurality of said output-sinusoidal signals having a sinusoidal shaped waveform of said desired frequency, wherein said sinusoidal waveforms are phase-shifted in relationship to each other;

providing a motor-speed-control signal for selecting said desired frequency to control the speed of the motor;

providing a motor-reverse-control signal, wherein when said reverse-control-input signal is in a first state, said phase-shift relationship of said plurality of analog signals has a first order, wherein when said reverse-control-input signal is in a second state, said phase-shift relationship of said analog signals has a second order, and wherein said first order is the time-inversion of said second order;

providing a motor-reverse-control signal, wherein when said reverse-control-input signal is in a first state, said phase-shift relationship of said plurality of analog signals has a first order;

wherein when said reverse-control-input signal is in a second state, said phase-shift relationship of said analog signals has a second order, and wherein said first order is the time-inversion of said second order;

wherein the rotational direction of said motor is determined by said order of said phase relationship of said output-sinusoidal signals;

providing a device, wherein the position of said device is determined by said motor; and providing a device-position feedback signal that corresponds to the actual position of said device, wherein said motor-speed-control signal and said motor-reverse-control signal are adjusted based on said device-position feedback.

\* \* \* \* \*